US012590228B2

(12) United States Patent
Ti et al.

(10) Patent No.: US 12,590,228 B2
(45) Date of Patent: Mar. 31, 2026

(54) CURABLE ADHESIVE COMPOSITION FOR DIE ATTACH

(71) Applicant: Henkel AG & Co. KGaA, Duesseldorf (DE)

(72) Inventors: Yang Ti, Shanghai (CN); Qili Wu, Shanghai (CN); Wei Yao, Shanghai (CN); Jiawen Zhao, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 1091 days.

(21) Appl. No.: 17/098,750

(22) Filed: Nov. 16, 2020

(65) Prior Publication Data

US 2021/0062047 A1 Mar. 4, 2021

Related U.S. Application Data

(63) Continuation of application No. PCT/CN2018/087085, filed on May 16, 2018.

(51) Int. Cl.

| | |
|---|---|
| ***C09J 7/35*** | (2018.01) |
| *C08K 3/08* | (2006.01) |
| *C08K 5/00* | (2006.01) |
| *C09J 9/02* | (2006.01) |

(52) U.S. Cl.

CPC .................. *C09J 7/35* (2018.01); *C08K 3/08* (2013.01); *C08K 2003/0806* (2013.01); *C08K 2003/0812* (2013.01); *C08K 2003/0831* (2013.01); *C08K 2003/0837* (2013.01); *C08K 2003/085* (2013.01); *C08K 2003/0862* (2013.01); *C08K 5/0025* (2013.01); *C08K 2201/003* (2013.01); *C09J 9/02* (2013.01); *C09J 2203/326* (2013.01); *C09J 2433/00* (2013.01); *C09J 2463/00* (2013.01); *Y10T 428/2857* (2015.01); *Y10T 428/287* (2015.01); *Y10T 428/2891* (2015.01); *Y10T 428/2896* (2015.01)

(58) Field of Classification Search

None

See application file for complete search history.

(56) References Cited

U.S. PATENT DOCUMENTS

| | | | | |
|---|---|---|---|---|
| 4,020,036 | A | 4/1977 | South, Jr. | |
| 4,101,604 | A | 7/1978 | Rowe | |
| 4,160,759 | A | 7/1979 | Gardner et al. | |
| 4,161,471 | A | 7/1979 | Kassal | |
| 5,397,618 | A | 3/1995 | Cedarleaf | |
| 5,717,034 | A | 2/1998 | Dershem et al. | |
| 6,022,616 | A | 2/2000 | Wu et al. | |
| 6,319,755 | B1 * | 11/2001 | Mauri | H01L 23/49513 257/E23.044 |
| 6,791,839 | B2 | 9/2004 | Bhagwagar | |
| 7,888,411 | B2 | 2/2011 | Wrosch et al. | |
| 8,222,751 | B2 | 7/2012 | Nomura et al. | |
| 8,540,903 | B2 | 9/2013 | Higuchi et al. | |
| 2009/0127518 | A1 * | 5/2009 | Nagano | H01B 1/22 252/514 |
| 2009/0155608 | A1 | 6/2009 | Nomura et al. | |
| 2010/0276645 | A1 | 11/2010 | Aspin et al. | |
| 2019/0132961 | A1 * | 5/2019 | Kobayashi | C04B 41/009 |

FOREIGN PATENT DOCUMENTS

| | | | | |
|---|---|---|---|---|
| CN | 1244561 | | 2/2000 | |
| CN | 101878509 | | 11/2010 | |
| CN | 104425054 | | 3/2015 | |
| EP | 2451881 | | 5/2012 | |
| JP | 2005530887 | A | 10/2005 | |
| JP | 2006523760 | A | 10/2006 | |
| JP | 2016222894 | A | 12/2016 | |
| KR | 10-2009-0037961 | | 4/2009 | |
| WO | 2003/072673 | | 9/2003 | |
| WO | 03072673 | | 9/2003 | |
| WO | 2008026517 | | 3/2008 | |
| WO | 2017066563 | | 4/2017 | |
| WO | WO-2018122971 | A1 * | 7/2018 | C04B 41/009 |

OTHER PUBLICATIONS

Sasamoto et al., abstract of JP 2018016722 A, Feb. 1, 2018 (Year: 2018).*

Machine translation of JPH11269443-A, Oct. 5, 1999 (Year: 1999).*

Machine translation of JP2016222894 A, Dec. 28, 2016 (Year: 2016).*

* cited by examiner

*Primary Examiner* — Anish P Desai

(74) *Attorney, Agent, or Firm* — Steven C. Bauman

(57) ABSTRACT

This invention relates to a curable adhesive composition. In particular, the present invention relates to a curable adhesive composition for die attach, which eliminates the void issue, minimizes the fillet, and has lower bond line thickness and tilt trend, when cured.

16 Claims, 4 Drawing Sheets

CURABLE ADHESIVE COMPOSITION FOR DIE ATTACH

TECHNICAL FIELD

This invention relates to a curable adhesive composition. In particular, the present invention relates to a curable adhesive composition for die attach, which eliminates the void issue, minimizes the fillet, and has lower bond line thickness and tilt trend, when cured.

BACKGROUND OF THE INVENTION

Pre-applied adhesive compositions are used for a variety of purposes in the fabrication and assembly of semiconductor packages and microelectronic devices. The more prominent uses include bonding of electronic elements such as integrated circuit chips to lead frames or other substrates, and bonding of circuit packages or assemblies to printed wire boards. Adhesives useful for electronic packaging applications typically exhibit properties such as good mechanical strength, curing properties that do not affect the component or the carrier, and rheological properties compatible with application to microelectronic and semiconductor components.

Due to the ever-increasing pressure to reduce the size of semiconductor packages, there has been a recent interest in thin die, such as die having a size from 0.2 mm×0.2 mm to 10.0 mm×10.0 mm. The miniaturization trend extends to multiple package types such as Quad Flat No-Lead (QFN), Dual-Flat No-lead (DFN), Small Outline Integrated Circuit (SOIC), Dual In-line Package (DIP), Small Outline Transistor (SOT), small plastic Quad Flat Package (QFP) devices, etc.

Semiconductor packaging using conventional die attach paste adhesive involves lowering a die onto a dispensed pattern of die attach paste until a fillet is formed around the die edges. Standard die attach techniques can sometimes limit the use of paste in tight tolerance packages, where the distance between fillet and bond pads on a substrate are minimal. A minimal fillet relies on precise control of bond line thickness (BLT), i.e., the thickness of the adhesive between the bottom of the die and the surface of the substrate. If the BLT is overly thin, the die is easily delaminated from the substrate due to high inner force or poor adhesion performance with the die surface and/or the substrate. If the BLT is uneven on the surface of a die, the paste adhesive tends to form bulky fillets that overflow onto the top of the die, thereby contaminating the top of the die and cause unreliable wire bonding. As a result, package assemblers of thinner die have had to use die-bonding film, which increases material cost and incurs capital equipment investment.

Moreover, when using conventional semiconductor packaging techniques, after the die is lowered onto a dispensed pattern of die attach paste, the die is typically pressed onto the paste to ensure proper bonding to a substrate. This step in the die attach process has become problematic as semiconductor die have become increasingly thin, i.e., pressure applied to thin die can crack, tilt or wrap the die. Packages containing cracked die must be scrapped, and the risk of rejected packages is multiplied when stacked die packages are assembled.

Another challenge for employing curable adhesives in thinner die application lies in the voids created in the cured product bonding the substrate and die. It occurs during the curing of the adhesive composition containing volatile solvent or spacers if the composition is cured faster than complete solvent volatilization or the deformation of spacers.

WO 2017066563 A discloses an electrically conductive adhesive formulation comprising an organic matrix, a particulated nickel or a particulated nickel-alloy as filler, and other metal filler. The adhesive formulation may be used as die attach paste adhesive.

WO 2003072673 A discloses an adhesive composition comprising at least one maleimide-containing monomer, optionally at least one cure initiator, and a plurality of spacers constructed from one or more organic polymers.

U.S. Pat. No. 6,022,616 B teaches an improved adhesive composition prepared from at least one organic polymer resin, an inorganic filler, and a fugitive liquid, in which the liquid and organic polymer resin are each substantially insoluble in the other; and in which the improvement comprises that the at least one organic polymer resin be present in particulate form of particle size that is 25 mu or smaller. Adhesive compositions so prepared can be used on dies 400 mil×400 mil or greater on metal substrates without significant delamination.

However, these attempts cannot completely solve the above-mentioned problems. Accordingly, there is a need in the art for curable adhesive compositions which provide excellent BLT control, and achieve no voids, minimum fillet, lower tilt trend, while at the same time maintain excellent adhesion strength when cured in the application for bonding thin die.

SUMMARY OF THE INVENTION

The present invention provides curable adhesive compositions which overcome the abovementioned disadvantage of conventional formulations. The curable adhesive compositions in this invention could achieve excellent BLT when applied and when cured. The curable adhesive composition in this invention eliminates voids when cured. The curable adhesive composition in this invention has lower tilt trend and minimum fillet when cured. Besides, the application of the curable adhesive composition is simple and suitable for industrial production.

The present invention, in general, provides a curable adhesive composition, comprising, (1) a thermosetting or thermoplastic resin component,
(2) a plurality of particles of a first metal or alloy having a melting point no higher than 300° C. and a $D_{50}$ particle size of from 10 μm to 100 μm,
(3) a plurality of particles of a second metal or alloy having a melting point higher than 300° C., and a $D_{50}$ particle size of from 0.1 μm to less than 10 μm, and
(4) optionally a curing agent.

The present invention also provides an assembly comprising a die adhered to a substrate by a cured product of the curable adhesive composition for die attach.

The present invention yet also provides a process of die attach, comprising:

(a) applying the curable adhesive composition to a substrate,
(b) bringing the substrate and a die into intimate contact to form an assembly, and
(c) subjecting the assembly to conditions suitable to cure the curable adhesive composition.

DETAILED DESCRIPTION OF THE INVENTION

Figure 1:
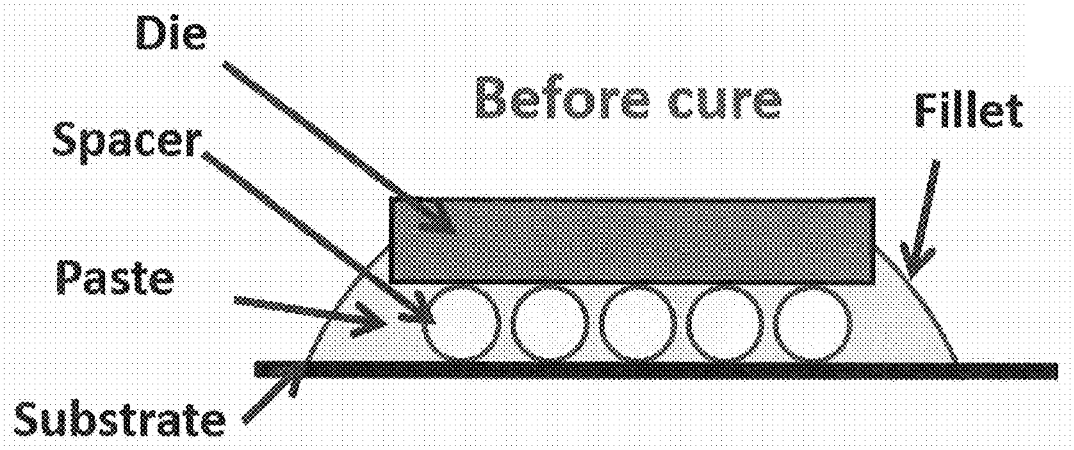
FIG. 1 is a schematic figure of die assembly including a die and a substrate attached by the adhesive composition according to the present invention before curing.
Figure 2:
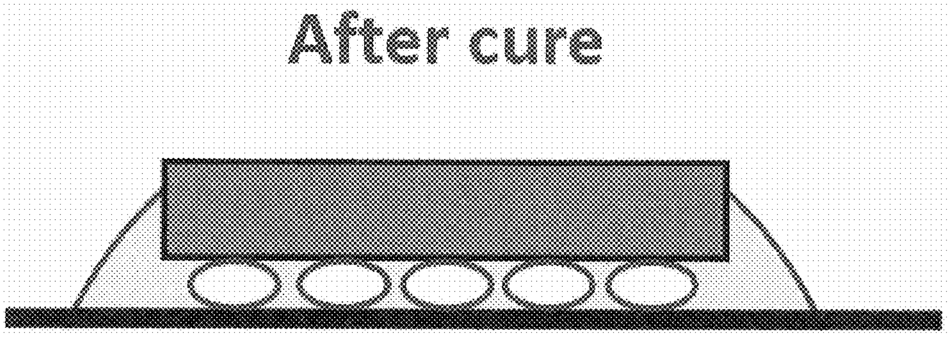
FIG. 2 is a schematic figure of die assembly including a die and a substrate attached by the adhesive composition according to the present invention after curing.

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The term "alloy" refers to a mixture containing two or more metals, and optionally additional non-metals, where the elements of the alloy are fused together or dissolved into each other when molten. The notation used herein for alloy compositions lists two or more elements using their IUPAC symbols separated by a forward slash ("/"). When given, the proportions of the elements in the alloy are indicated by number after the element corresponding to the weight percent of the element in the alloy. For example, Sn/Bi represents an alloy of tin (Sn) and bismuth (Bi), which can be any proportion of these two elements. Sn60/Bi40 represents a specific alloy of tin and bismuth that contains 60 percent by weight of tin and 40 percent by weight of bismuth. Where a range is given for the weight percent of an element(s) in an alloy, the range indicates that the element can be present in any amount within the indicated range. For example, Sn(70-90)/Bi(10-30) refers to an alloy containing from 70 weight percent to 90 weight percent of tin, and from 10 weight percent to 30 weight percent of bismuth. Thus, alloys encompassed by the "Sn(70-90)/Bi(10-30)" range include, but are not limited to: Sn70/Bi30, Sn71/Bi29, Sn72/Bi28, Sn73/Bi27, Sn74/Bi26, Sn75/Bi25, Sn76/Bi24, Sn77/Bi23, Sn78/Bi22, Sn79/Bi21, Sn80/Bi20, Sn81/Bi19, Sn82/Bi18, Sn83/Bi17, Sn84/Bi16, Sn85/Bi15, Sn86/Bi14, Sn87/Bi13, Sn88/Bi12, Sn89/Bi11, and Sn90/Bi10. Furthermore, Sn(70-90)/Bi(10-30) represents alloys in which the specific proportion of the elements Sn and Bi may vary from Sn70/Bi30 to Sn90/Bi10 inclusive of proportions of Sn varying from 70 up to 90 weight percent and Bi inversely varying from 30 down to 10 weight percent.

The terms "melting temperature" or "melting point," as used herein, refer to the temperature (a point) at which a solid becomes a liquid at atmospheric pressure.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

According to the present invention, the curable adhesive composition comprises a thermosetting or thermoplastic resin component, a plurality of particles of a first metal or alloy having a melting point no higher than 300° C. and a $D_{50}$ particle size of from 10 μm to 100 μm, a plurality of particles of a second metal or alloy having a melting point higher than 300° C. and a $D_{50}$ particle size of from 0.1 μm to less than 10 μm, and optionally a curing agent.

In one embodiment, the $D_{50}$ particle size of the particles of the first metal or alloy is larger than that of the particles of second metal or alloy by 5%, preferably by 50% and more preferably by 100%.

The thermosetting resin or thermoplastic resin component(s) are provided in the compositions described herein to improve one or more performance properties such as, for example, tackiness, wetting ability, flexibility, work life, high temperature adhesion, and/or resin-filler compatibility prepared from invention compositions. In addition, the thermosetting resin or thermoplastic resin component(s) are provided in the compositions described herein to improve one or more performance properties such as, for example, rheology, dispensability prepared from invention compositions.

The thermosetting resin or thermoplastic resin component(s) can be any resin capable of imparting one or more of the above-listed properties to the compositions, including, but not limited to an acetal, an (meth)acrylic monomer, oligomer, or polymer, an acrylonitrile-butadiene-styrene (ABS) polymer or copolymer or a polycarbonate/ABS alloy, an alkyd, a butadiene, a styrene-butadiene, a cellulosic, a coumarone-indene, a cyanate ester, a diallyl phthalate (DAP), an epoxy monomer, oligomer, or polymer, a flexible epoxy or polymer with epoxy functional groups, a fluoropolymer, a melamine-formaldehyde, a neoprene, a nitrile resin, a novolac, a nylon, a petroleum resin, a phenolic, a polyamide-imide, a polyarylate and polyarylate ether sulfone or ketone, a polybutylene, a polycarbonate, a polyester and co-polyestercarbonate, a polyetherester, a polyethylene, a polyimide, a maleimide, a nadimide, an itaconamide, a polyketone, a polyolefin, a polyphenylene oxide, a sulfide, an ether, a polypropylene and polypropylene-EPDM blend, a polystyrene, a polyurea, a polyurethane, a vinyl polymer, rubbers, a silicone polymer, a siloxane polymer, a styrene acrylonitrile, a styrene butadiene latex and other styrene copolymers, a sulfone polymer, a thermoplastic polyester (Saturated), a phthalate, an unsaturated polyester, a urea-formaldehyde, a polyacrylamide, a polyglycol, a polyacrylic acid, a poly(ethylene glycol), an inherently conductive polymer, a fluoropolymer, and the like, as well as combinations of any two or more thereof.

Maleimides, nadimides, or itaconamides contemplated for use herein have the structure:

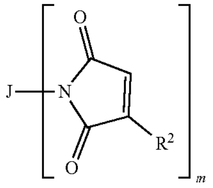

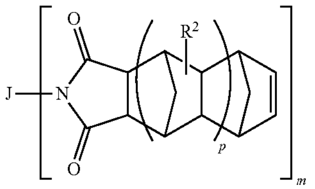

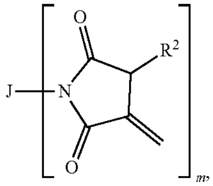

respectively, wherein:

m is 1-15, p is 0-15, each $R^2$ is independently selected from hydrogen or lower alkyl (such as $C_{1-5}$), and J is a monovalent or a polyvalent radical comprising organic or organosiloxane radicals, and combinations of any two or more thereof.

In certain embodiments, J is a monovalent or polyvalent radical selected from:

hydrocarbyl or substituted hydrocarbyl species typically having in the range of about 6 up to about 500 carbon atoms, where the hydrocarbyl species is selected from alkyl, alkenyl, alkynyl, cycloalkyl, cycloalkenyl, aryl, alkylaryl, arylalkyl, aryalkenyl, alkenylaryl, arylalkynyl or alkynylaryl, provided, however, that X can be aryl only when X comprises a combination of two or more different species;

hydrocarbylene or substituted hydrocarbylene species typically having in the range of about 6 up to about 500 carbon atoms, where the hydrocarbylene species are selected from alkylene, alkenylene, alkynylene, cycloalkylene, cycloalkenylene, arylene, alkylarylene, arylalkylene, arylalkenylene, alkenylarylene, arylalkynylene or alkynylarylene, heterocyclic or substituted heterocyclic species typically having in the range of about 6 up to about 500 carbon atoms, polysiloxane, or polysiloxane-polyurethane block copolymers, as well as combinations of one or more of the above with a linker selected from covalent bond, —O—, —S—, —NR—, —NR—C(O)—, —NR—C(O)—O—, —NR—C(O)—NR—, —S—C(O)—, —S—C(O)—O—, —S—C(O)—NR—, —O—$S(O)_2$—, —O—$S(O)_2$—O—, —O—$S(O)_2$—NR—, —O—S(O)—, —O—S(O)—O—, —O—S(O)—NR—, —O—NR—C(O)—, —O—NR—C(O)—O—, —O—NR—C(O)—NR—, —NR—O—C(O)—, —NR—O—C(O)—O—, —NR—O—C(O)—NR—, —O—NR—C(S)—, —O—NR—C(S)—O—, —O—N R—C(S)—NR—, —NR—O—C(S)—, —NR—O—C(S)—O—, —NR—O—C(S)—NR—, —O—C(S)—, —O—C(S)—O—, —O—C(S)—NR—, —NR—C(S)—, —NR—C(S)—O—, —NR—C(S)—NR—, —S—$S(O)_2$—, —S—$S(O)_2$—O—, —S—$S(O)_2$—NR—, —NR—O—S(O)—, —NR—O—S(O)—O—, —NR—O—S(O)—NR—, —NR—O—$S(O)_2$—, —NR—O—$S(O)_2$—O—, —NR—O—$S(O)_2$—NR—, —O—NR—S(O)—, —O—NR—S(O)—O—, —O—NR—S(O)—NR—, —O—NR—$S(O)_2$—O—, —O—NR—$S(O)_2$—NR—, —O—NR—$S(O)_2$—, —O—$P(O)R_2$—, —S—$P(O)R_2$—, or —NR—$P(O)R_2$—; where each R is independently hydrogen, alkyl or substituted alkyl.

Exemplary maleimides, nadimides, or itaconamides contemplated for use herein include 4,4'-diphenylmethane bismaleimide, 4,4'-diiphenylether bismaleimide, 4,4'diiphenylsulfone bismaleimide, phenylmethane maleimide, m-phenylene bismaleimide, 2,2'-bis[4-(4-maleimidophenoxy)phenyl]propane, 3,3'-dimethyl-5,5'-diethyl-4,4'-diphenylmethane bismaleimide, 4-methyl-1,3-phenylene bismaleimide, 1,6'-bismaleimide-(2,2,4-trimethyl)hexane, 1,3-bis(3-maleimidophenoxy)benzene, 1,3-bis(4-maleimidophenoxy)-benzene, and the like.

Other examples of maleimides are compounds represented by the formulae as follows. These compounds are commercially available from such as Henkel Corporation.

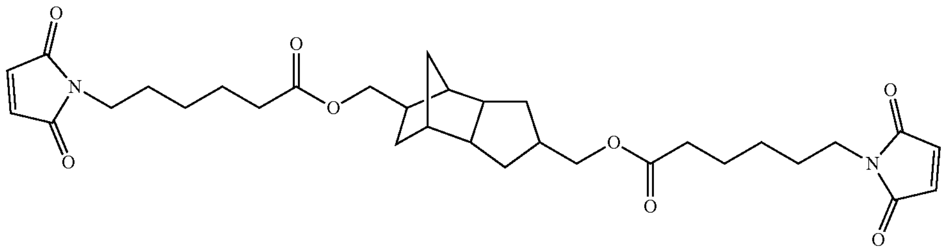

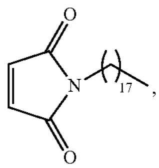

,

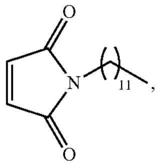

,

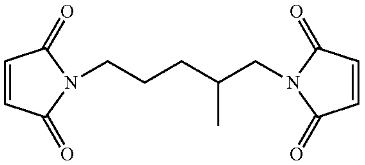

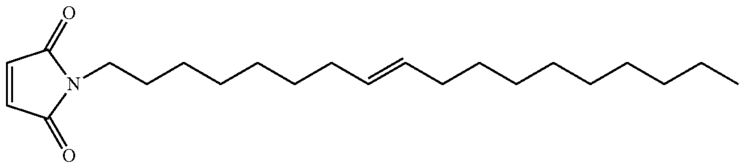

-continued
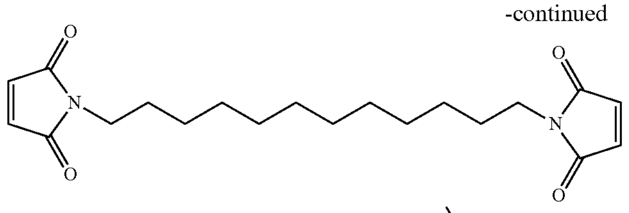
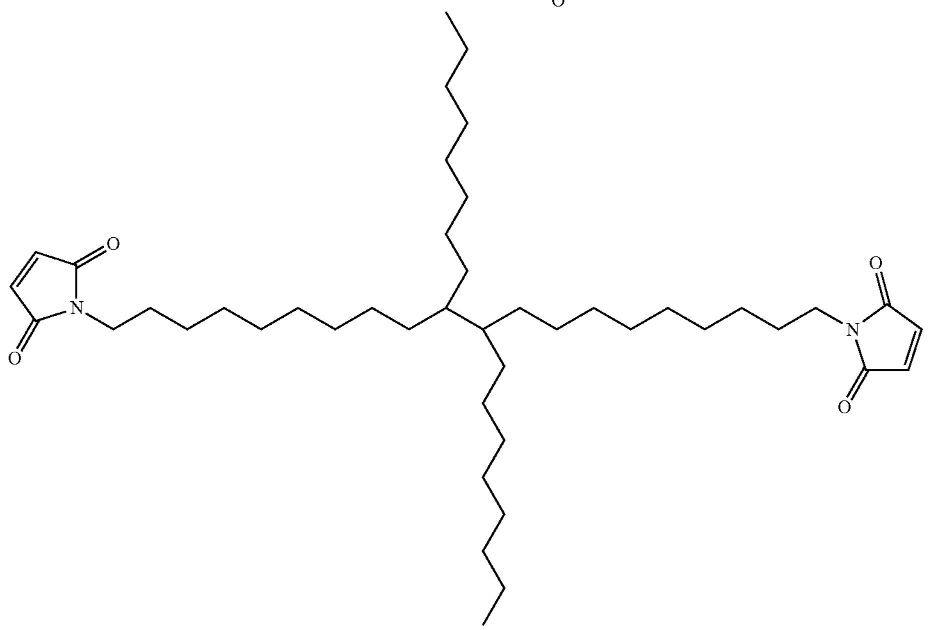
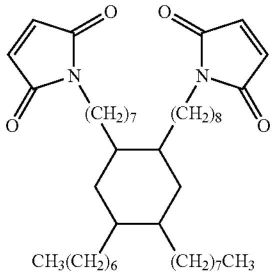
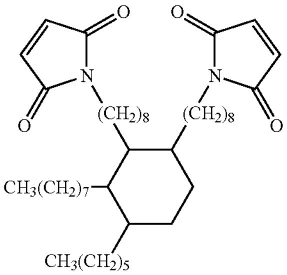
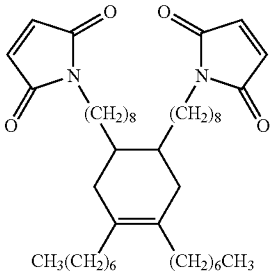
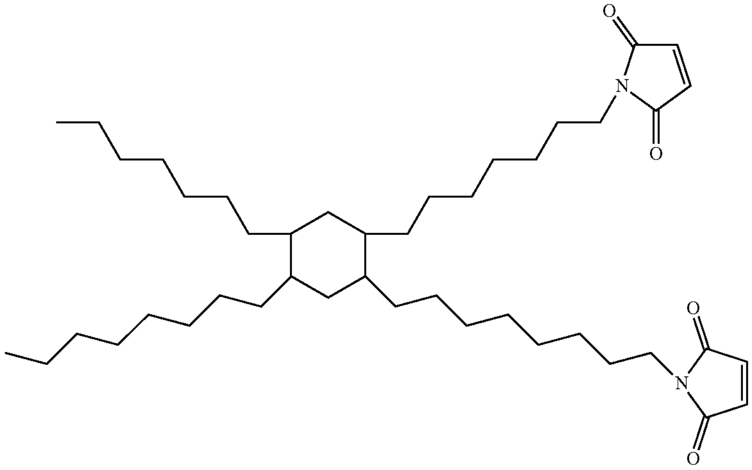
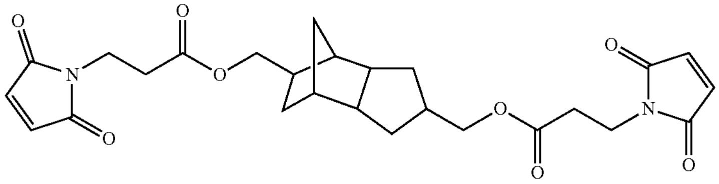

-continued

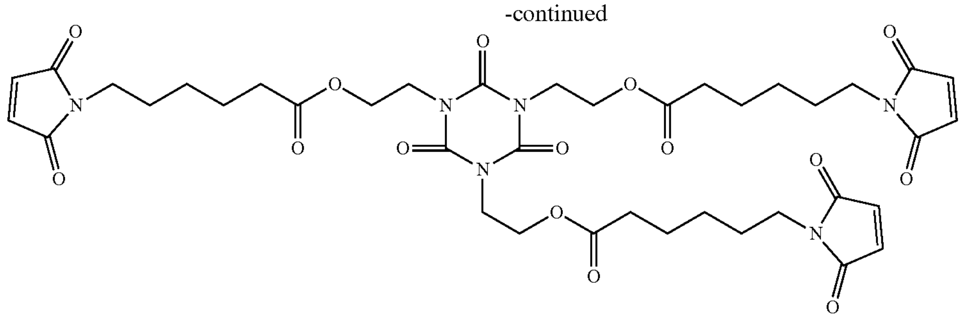

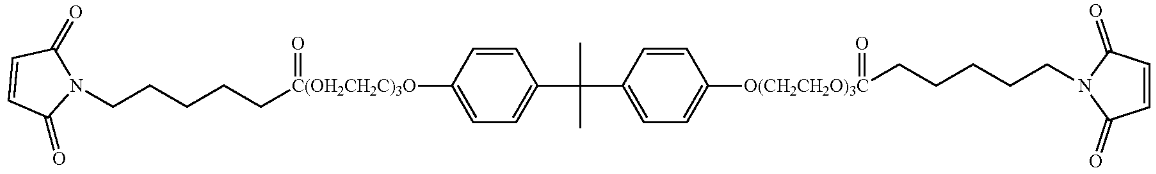

Other examples are maleic anhydride grafted polybutadienes and the alcohol condensates derived therefrom such as RICON 130MA8, RICON MA13, RICON 130MA20, RICON 131MAS, RICON 131MA10, RICON MA17, RICON MA20, RICON 184MA6 and RICON 156MA17 from Ricon Resins, Inc.

The one or more epoxy monomers, oligomers, or polymers contemplated for use herein, which are also referred to herein as epoxy resins, can include an epoxy having an aliphatic backbone, an aromatic backbone, a modified epoxy resin, or a mixture of these. In certain embodiments, the one or more epoxy monomers, oligomers, or polymers include a functionalized epoxy monomer, oligomer, or polymer. The epoxy functionality in the epoxy resin is at least one. In some embodiments, the epoxy resin is one (i.e., the epoxy resin is a mono-functional epoxy resin). In other embodiments, the epoxy resin contains at least two or more epoxy functional groups (e.g., 2, 3, 4, 5, or more).

The epoxy resins contemplated for use in the practice of the present invention are not limited to resins having a particular molecular weight. Exemplary epoxy resins can have a molecular weight in the range of about 50 or less up to about 1,000,000. In certain embodiments, epoxy resins contemplated for use herein have a molecular weight in the range of about 200,000 up to about 900,000. In other embodiments, epoxy resins contemplated for use herein have a molecular weight in the range of about 10,000 up to about 200,000. In still other embodiments, epoxy resins contemplated for use herein have a molecular weight in the range of about 1,000 up to about 10,000. In still other embodiments, epoxy resins contemplated for use herein have a molecular weight in the range of about 50 up to about 10,000.

In some embodiments, the epoxy resins can be liquid epoxy resins or solid epoxy resins containing aromatic and/or aliphatic backbones, such as the diglycidyl ether of bisphenol F or the diglycidyl ether of bisphenol A. Optionally, the epoxy resin is a flexible epoxy. The flexible epoxy can have a chain length of variable length (e.g., a short chain or a long chain), such as a short-chain length or long-chain length polyglycol diepoxide liquid resin. An exemplary short chain length polyglycol diepoxide liquid resin includes D.E.R. 736 and an exemplary long chain length polyglycol diepoxide liquid resin includes D.E.R. 732, both commercially available from Dow Chemical Company (Midland, Mich.).

Exemplary epoxies contemplated for use herein include liquid-type epoxy resins based on bisphenol A, solid-type epoxy resins based on bisphenol A, liquid-type epoxy resins based on bisphenol F (e.g., Epiclon EXA-835LV), multifunctional epoxy resins based on phenol-novolac resin, dicyclopentadiene-type epoxy resins (e.g., Epiclon HP-7200L), naphthalene-type epoxy resins, and the like, as well as mixtures of any two or more thereof. Other examples are Epon Resin 862, Epiclon N-730A (epichlorohydrin-phenol formaldehyde from Dainippon Ink & Chemical); Epiclon 830S; Araldite GY285 (Chemica Inc.); RSL-1739 (P Bisphenol F/epichlorohydrin epoxy resin, from Resolution Performance Products); NSC Epoxy 5320 (1,4-butanedioldiglycidyl ether, from Henkel Corporation); and EX-201-IM (resorcinol diglycidyl ether, from Nagase Chemtex Corporation).

In certain embodiments, epoxies contemplated for use herein include diglycidyl ether of bisphenol A epoxy resin, of diglycidyl ether of bisphenol F epoxy resin, epoxy novolac resins, epoxy cresol resins, and the like.

In some embodiments, the epoxy resins can be toughened epoxy resins, such as epoxidized carboxyl-terminated butadiene-acrylonitrile (CTBN) oligomers or polymers, epoxidized polybutadiene diglycidylether oligomers or polymers, heterocyclic epoxy resins (e.g., isocyanate-modified epoxy resins), and the like.

In certain embodiments, the epoxidized CTBN oligomer or polymer is an epoxy-containing derivative of an oligomeric or polymeric precursor having the structure:

$$HOOC[(Bu)_x(ACN)_y]_mCOOH$$

wherein:

each Bu is a butylene moiety (e.g., 1,2-butadienyl or 1,4-butadienyl), each ACN is an acrylonitrile moiety, the Bu units and the ACN units can be arranged randomly or in blocks, each of x and y are greater than zero, provided the total of x+y=1, the ratio of x:y falls in the range of about 10:1 to 1:10, and m falls in the range of about 20 to about 100.

As readily recognized by those of skill in the art, epoxidized CTBN oligomers or polymers can be made in a variety of ways, e.g., from (1) a carboxyl terminated butadiene/acrylonitrile copolymer, (2) an epoxy resin and (3) bisphenol A:

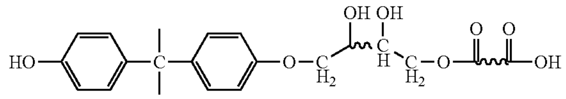

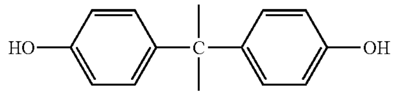

BisphenolA Chain Extender

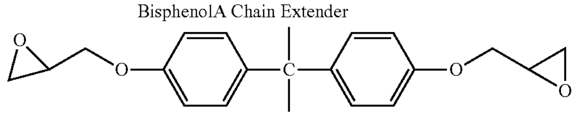

Reactive Epoxy

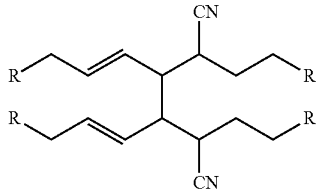

R = Carboxyl Groups by reaction between the carboxylic acid group of CTBN and epoxies (via chain-extension reactions), and the like.

In some embodiments, the epoxy resin can include epoxidized CTBN oligomers or polymers made from (1) a carboxyl terminated butadiene/acrylonitrile copolymer, (2) an epoxy resin, and (3) bisphenol A as described above; Hypro™ Epoxy-Functional Butadiene-Acrylonitrile Polymers (formerly Hycar® ETBN), and the like.

In certain embodiments, the epoxy resin contemplated for use herein includes a rubber or elastomer-modified epoxy. Rubber or elastomer-modified epoxies include epoxidized derivatives of:

(a) homopolymers or copolymers of conjugated dienes having a weight average molecular weight (Mw) of 30,000 to 400,000 or higher as described in U.S. Pat. No. 4,020,036 (the entire contents of which are hereby incorporated by reference herein), in which conjugated dienes contain from 4-11 carbon atoms per molecule (such as 1,3-butadiene, isoprene, and the like);

(b) epihalohydrin homopolymers, a copolymer of two or more epihalohydrin monomers, or a copolymer of an epihalohydrin monomer(s) with an oxide monomer(s) having a number average molecular weight ($M_n$) which varies from about 800 to about 50,000, as described in U.S. Pat. No. 4,101,604 (the entire contents of which are hereby incorporated by reference herein);

(c) hydrocarbon polymers including ethylene/propylene copolymers and copolymers of ethylene/propylene and at least one nonconjugated diene, such as ethylene/propylene/hexadiene/norbornadiene, as described in U.S. Pat. No. 4,161,471; or (d) conjugated diene butyl elastomers, such as copolymers consisting of from 85 to 99.5% by weight of a $C_4$-$C_5$ olefin combined with about 0.5 to about 15% by weight of a conjugated multi-olefin having 4 to 14 carbon atoms, copolymers of isobutylene and isoprene where a major portion of the isoprene units combined therein have conjugated diene unsaturation (see, for example, U.S. Pat. No. 4,160,759; the entire contents of which are hereby incorporated by reference herein).

In certain embodiments, the epoxy resin is an epoxidized polybutadiene diglycidylether oligomer or polymer.

In certain embodiments, epoxidized polybutadiene diglycidylether oligomers contemplated for use herein have the structure:

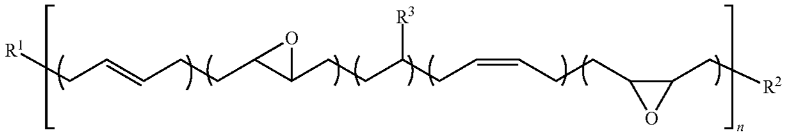

wherein:

$R^1$ and $R^2$ are each independently H or lower alkyl, $R^3$ is H, saturated or unsaturated hydrocarbyl, or epoxy, at least 1 epoxy-containing repeating unit set forth above, and at least one olefinic repeating unit set forth above are present in each oligomer, and, when present, in the range of 1-10 of each repeating unit is present, and n falls in the range of 2-150.

In certain embodiments, an epoxidized polybutadiene diglycidylether oligomer or polymer contemplated for use in the practice of the present invention has the structure:

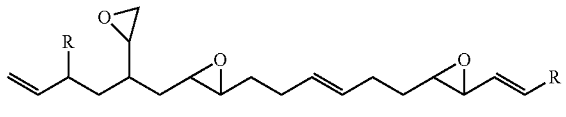

wherein R is H, OH, lower alkyl, epoxy, oxirane-substituted lower alkyl, aryl, alkaryl, and the like. Further examples of the epoxy resin contemplated for use herein include epoxies having a flexible backbone. For example, the epoxy resin can include:

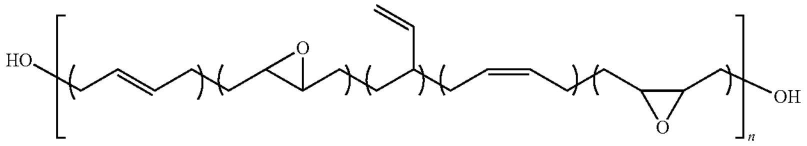

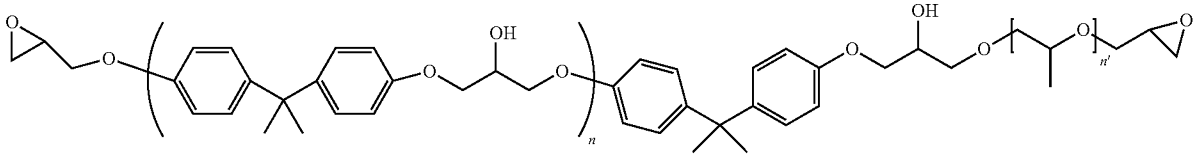

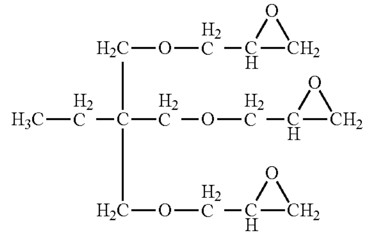

and the like.

In some embodiments, additional epoxy materials may be included in invention formulations. When included in invention formulations, a wide variety of epoxy-functionalized resins are contemplated for use herein, e.g., epoxy resins based on bisphenol A (e.g., Epon Resin 834), epoxy resins based on bisphenol F (e.g., RSL-1739 or JER YL980), multifunctional epoxy resins based on phenol-novolac resin, dicyclopentadiene-type epoxy resins (e.g., Epiclon HP-7200L), naphthalene-type epoxy resins, and the like, as well as mixtures of any two or more thereof.

Exemplary epoxy-functionalized resins contemplated for use herein include the diepoxide of the cycloaliphatic alcohol, hydrogenated bisphenol A (commercially available as Epalloy 5000), a difunctional cycloaliphatic glycidyl ester of hexahydrophthallic anhydride (commercially available as Epalloy 5200), Epiclon EXA-835LV, Epiclon HP-7200L, and the like, as well as mixtures of any two or more thereof.

Additional examples of conventional epoxy materials which are suitable for use as optional additional component of invention formulations include:

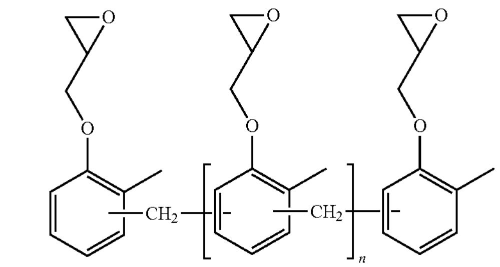

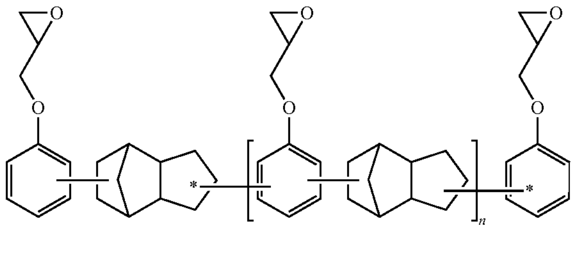

and the like.

Exemplary epoxy-functionalized resins contemplated for use herein include the epoxidized CTBN rubbers 561A, 24-440B, and EP-7 (commercially available from Henkel Corporation; Salisbury, N.C. & Rancho Dominguez, Calif.); diepoxide of the cycloaliphatic alcohol hydrogenated bisphenol A (commercially available as Epalloy 5000); a difunctional cycloaliphatic glycidyl ester of hexahydrophthallic anhydride (commercially available as Epalloy 5200); ERL 4299; CY-179; CY-184; and the like, as well as mixtures of any two or more thereof.

Optionally, the epoxy resin can be a copolymer that has a backbone that is a mixture of monomeric units (i.e., a hybrid backbone). The epoxy resin can include straight or branched chain segments. In certain embodiments, the epoxy resin can be an epoxidized silicone monomer or oligomer. Optionally, the epoxy resin can be a flexible epoxy-silicone copolymer. Exemplary flexible epoxy-silicone copolymers contemplated for use herein include ALBIFLEX 296 and ALBIFLEX 348, both commercially available from Evonik Industries (Germany).

In some embodiments, one epoxy monomer, oligomer, or polymer is present in the composition. In certain embodiments, combinations of epoxy monomers, oligomers, or polymers are present in the composition. For example, two or more, three or more, four or more, five or more, or six or more epoxy monomers, oligomers, or polymers are present in the composition. Combinations of epoxy resins can be selected and used to achieve the desired properties for films or pastes prepared from the compositions. For example, combinations of epoxy resins can be selected such that films prepared from the compositions exhibit one or more of the following improved properties: film quality, tackiness, wetting ability, flexibility, work life, high temperature adhesion, resin-filler compatibility, sintering capability, and the like. Combinations of epoxy resins can be selected such that pastes prepared from the compositions exhibit one or more improved properties such as rheology, dispensability, work life, sintering capability, and the like.

The one or more epoxy monomers, oligomers, or polymers can be present in the composition in an amount of up to about 50 percent by weight of the total solids content of the composition (i.e., the composition excluding diluents).

For example, the one or more epoxy monomers, oligomers, or polymers can be present in the composition in an amount of from about 3 percent by weight to about 50 percent by weight, from about 10 percent by weight to about 50 percent by weight, or from about 10 percent by weight to about 35 percent by weight. In some embodiments, the one or more epoxy monomers, oligomers, or polymers can be present in the composition in an amount of about 50 percent by weight or less, about 45 percent by weight or less, about 40 percent by weight or less, about 35 percent by weight or less, about 30 percent by weight or less, about 25 percent by weight or less, about 20 percent by weight or less, about 15 percent by weight or less, about 10 percent by weight or less, or about 5 percent by weight or less based on the weight of the total solids content of the composition.

The compositions described herein can further include an acrylic monomer, polymer, or oligomer. Acrylates contemplated for use in the practice of the present invention are well known in the art. See, for example, U.S. Pat. No. 5,717,034, the entire contents of which are hereby incorporated by reference herein.

The (meth)acrylic monomers, polymers, or oligomers contemplated for use in the practice of the present invention are not limited to a particular molecular weight. Exemplary (meth)acrylic resins can have a molecular weight in the range of about 50 or less up to about 1,000,000. In some embodiments, (meth)acrylic polymers contemplated for use herein can have a molecular weight in the range of about 100 up to about 10,000 and a Tg in the range of about −40° C. up to about 20° C. In certain embodiments, (meth)acrylic polymers contemplated for use herein have a molecular weight in the range of about 10,000 up to about 900,000 (e.g., about 100,000 up to about 900,000 or about 200,000 up to about 900,000) and a Tg in the range of about −40° C. up to about 20° C. Examples of (meth)acrylic copolymers for use in the compositions described herein include Teisan Resin SG-P3 and Teisan Resin SG-80H (both commercially available from Nagase Chemtex Corp.; Japan), SR423A (from Sartomer Company Inc.). Optionally, the (meth) acrylic polymer or oligomer for use in the compositions described herein can be degradable (meth)acrylic polymers or oligomers or epoxy-modified acrylic resins.

The (meth)acrylic monomers, polymers, and/or oligomers can be present in the composition in an amount of up to about 50 percent by weight of the total solids content of the composition. For example, the (meth)acrylic monomers, copolymers, and/or oligomers can be present in the composition in an amount from about 5 percent by weight to about 50 percent by weight, or from about 10 percent by weight to about 50 percent by weight, or from about 10 percent by weight to about 35 percent by weight, or from about 5 percent by weight to about 30 percent by weight, or from about 5 percent by weight to about 20 percent by weight. In some embodiments, the (meth)acrylic monomers, copolymers, and/or oligomers are present in the composition in an amount of about 50 percent by weight or less, about 45 percent by weight or less, about 40 percent by weight or less, about 35 percent by weight or less, about 30 percent by weight or less, about 25 percent by weight or less, 20 percent by weight or less, about 15 percent by weight or less, about 10 percent by weight or less, or about 5 percent by weight or less based on the weight of the total solids content of the composition.

Exemplary (meth)acrylates contemplated for use herein include monofunctional (meth)acrylates, difunctional (meth)acrylates, trifunctional (meth)acrylates, polyfunctional (meth)acrylates, and the like, as well as mixtures of any two or more thereof.

Additional thermosetting resin or thermoplastic resin components contemplated for use in the compositions described herein can include polyurethanes, cyanate esters, polyvinyl alcohols, polyesters, polyureas, polyvinyl acetal resins, and phenoxy resins. In some embodiments, the compositions can include imide-containing monomers, oligomers, or polymers, such as maleimides, nadimides, itaconimides, bismaleimides, or polyimides.

The thermosetting resin or thermoplastic resin components, including the one or more epoxy monomers, polymers, or oligomers; the acrylic monomers, polymers, or oligomers, the phenolics; the novalacs; the polyurethanes; the cyanate esters; the polyvinyl alcohols; the polyesters; the polyureas; the polyvinyl acetal resins; the phenoxy resins; and/or the imide-containing monomers, polymers, or oligomers (e.g., the maleimides, bismaleimides, and polyimides) can be combined to form a binder. The binder can be solid, semi-solid, or liquid. Optionally, the binder has a decomposition temperature of less than 350° C.

Cyanate ester monomers contemplated for use herein contain two or more ring forming cyanate (—O—CEN) groups which cyclotrimerize to form substituted triazine rings upon heating.

In one particular embodiment, the thermosetting or thermoplastic resin component is selected from epoxy monomer, epoxy oligomer, epoxy polymer, (meth)acrylic monomer, (meth)acrylic oligomer, (meth)acrylic polymer, phenol-formaldehyde resin, polyurethane, cyanate ester, polyvinyl alcohol, a polyester, polyurea, polyvinyl acetal resin, phenoxy resin, maleimide, bismaleimide, nadimide, itaconamide, polyimide, and mixture thereof. Preferably, the thermosetting or thermoplastic resin component is selected from epoxy monomer, epoxy oligomer, epoxy polymer, (meth) acrylic monomer, (meth)acrylic oligomer, (meth)acrylic polymer, maleimide, bismaleimide, and mixture thereof.

According to the present invention, the thermosetting or thermoplastic resin component is present in an amount of 0.5% to 30%, preferably 1% to 25%, and more preferably 3% to 20% by weight based on the total weight of the curable adhesive composition for die attach.

The curable adhesive composition for die attach also comprises a plurality of particles of a first metal or alloy which has a melting point no higher than 300° C. (i.e. low melting temperature metal or alloy) and has a $D_{50}$ particle size of from 10 μm to 100 μm. The low melting temperature metal or alloy is used as spacer in the composition to support the bonding area between substrate and die. Herein, the "$D_{50}$ particle size" of the particles of a first metal or alloy represents a median diameter in a volume-basis particle size distribution curve obtained by measurement with a laser diffraction particle size analyzer.

The inventors have surprisingly found that when the spacer particles of low melting temperature metal and/or alloy are contained with other components in the composition, the curable adhesive composition is capable of eliminating the voids, achieving thinner BLT, and fewer tilt trends, when cured and applied for the attaching of smaller dies.

The particles of the first metal or alloy has a melting point no higher than, 300° C., preferably from 50° C. to 300° C., more preferably from 70° C. to 200° C., and in particular from 100° C. to 200° C. These metals and alloys are collectively so called low melting point alloy (LMA) in the context of the present invention.

Suitable particles of LMA include comprise at least one of indium (In), germanium (Ga), bismuth (Bi), or tin (Sn). Preferably, the particles of LMA comprise greater than 30% by mass of one of In, Ga, Bi, or Sn. Trace amounts of cadmium and lead can be incorporated into the LMA to lower the melting point of the alloy. However, in order to fulfill the requirement of local regulations for environment protection, such as RoHS regulation, the particles of LMA in particular comprise essentially no, such as less than 0.1 wt %, or less than 0.05 wt % of, lead (Pb) and cadmium (Cd), and preferably comprise no Pb and Cd. Preferred low melting point metals are In and Sn. Preferred low melting point alloys is a mixture of Ga, In, Bi, Sn, Ag, Zn, Sb, Au and Cu, such as In/Sn alloy, In/Bi alloy, Sn/Bi alloy, In/Sn/Bi alloy, Sn/Bi/Ag alloy, Sn/Ag/Cu alloy, Sn/Cu alloy, In/Sn/Zn alloy, Sn/Ag/Cu/Sb alloy, and Sn/Au alloy. Exemplary low melting point alloys are In(51)/Bi(32.5)/Sn(16.5), In(66.3)/Bi(33.7), In(26)/Bi(57)/Sn(17), Bi(54)/In(29.7)/Sn(16.3), In(52.2)/Sn(46)/Zn(1.8), Bi(67.0)/In(33.0), In(52)/Sn(48), In(50)/Sn(50), Sn(52)/In(48), Bi(58)/Sn(42), Bi(57)/Sn(42)/Ag(1), In(97)/Ag(3), Sn(58)/In(42), In(95)/Bi(5), In(99.3)/Ga(0.7), In(90)/Sn(10), In(99.4)/Ga(0.6), In(99.6)/Ga(0.4), In(99.5)/Ga(0.5), Sn(60)/Bi(40), Sn(86.5)/Zn(5.5)/In(4.5)/Bi(3.5), Sn(77.2)/In(20.0)/Ag(2.8), Sn(83.6)/In(8.8)/Zn(7.6), Sn(91)/Zn(9), Sn(86.9)/In(10)/Ag(3.1), Sn(91.8)/Bi(4.8)/Ag(3.4), Sn(90)/Au(10), Sn(95.5)/Ag(3.8)/Cu(0.7), Sn(95.5)/Ag(3.9)/Cu(0.6), Sn(96.5)/Ag(3.5), Sn(97)/Ag(3), Sn(95.5)/Ag(4.0)/Cu(0.5), Sn(96.2)/Ag(2.5)/Cu(0.8)/Sb(0.5), Sn(98.5)/Ag(1.0)/Cu(0.5), Sn(97.5)/Ag(2.5), Sn(98.5)/Ag(1.0)/Cu(0.5), Sn(98.5)/Ag(0.5)/Cu(1.0), Sn(99)/Ag(1), Sn(99)/Cu(1), Sn(99.3)/Cu(0.7), Sn(99.2)/Cu(0.5)/Bi(0.3), Sn(99.5)/Cu(0.5), Sn(65)/Ag(25)/Sb(10), Sn(99)/Sb(1), In(99)/Ag(10), Sn(97)/Sb(3), Sn(95.0)/Ag(5), Sn(95)/Sb(5), Bi(95)/Sn(5), with a melting point (liquidus temperature) from 50° C. to 300° C. These low melting point metal or alloy are commercially available, such as Heraeus Co., Ltd. Sigma Aldrich Co., Ltd., 5N Plus Co., Ltd. (under the tradename of MCP series, such as MCP 137 (Bi/Sn alloy), MCP 150 (Bi/Sn alloy), MCP 61 (Bi/Sn/In alloy), MCP 79 (Bi/Sn/In alloy), etc), and Merck Millipore GmbH.

According to the present invention, the spacers of low melting point alloy or metal have a $D_{50}$ particle size of from 10 μm to 100 μm, preferably from 10 μm to 50 μm, and preferably from 12.5 μm to 35 μm. If the $D_{50}$ particle size of the spacer is larger than 100 μm, fillet can be easily generated in the attaching of smaller size dies. If the $D_{50}$ particle size of the spacer is less than 10 μm, the spacer may fail to support the die and the substrate.

According to the present invention, the spacers of low melt point alloy have a tap density of from 3 to 12 g/cm$^3$, preferably from 5 to 10 g/cm$^3$. If the density is too lower or too high, the spacers may not be miscible with other components and may not well dispersed in adhesive composition, especially when the adhesive composition is heated to cure. The inhomogeneity of the spacers may cause a serious tilt trend which will increase the risk of attaching failure when the die and the spacers are subjected to loading force.

The shape of the low melting point alloy or metal is not particularly limited, and examples of which include a spherical-shaped, approximately spherical-shaped, elliptical spherical-shaped, spindle-shaped, cube-shaped, approximately cube-shaped, flake-shaped, and unshaped-shaped. Among them, from the viewpoint of preservation stability, the spherical-shaped, approximately spherical-shaped, and flake-shaped fillers are preferably used.

According to the present invention, the particles of a first metal or alloy are present in an amount of 0.1% to 5%, preferably 0.3% to 3%, and more preferably 0.5% to 2% by weight based on the total weight of the curable adhesive composition for die attach.

The curable adhesive composition also comprises a plurality of particles of a second metal or alloy as conductive filler. The conductive filler particles have a melting point higher than 300° C., preferably from 350° C. to 2000° C., more preferably from 400° C. to 1500° C., and even more preferably from 500° C. to 1200° C. The particles of the second metal or alloy comprise at least one of gold (Au), silver (Ag), nickel (Ni), aluminum (Al) or copper (Cu), and comprise greater than 50% by mass of one of Au, Ag, or Cu. In one embodiment, the particles of the second metal or alloy comprise silver, and comprise greater than 50%, and preferable great than 70%, or even greater than 90% by mass of silver.

The conductive filler particles have a $D_{50}$ particle size of from 0.1 μm to less than 10 μm, preferably from 0.5 μm to 8 μm, and more preferably from 2 μm to 6 μm. When the particle diameter of the conductive filler is within the above range, the fillers are well dispersed in the curable adhesive composition, which can improve the preservation stability of the curable adhesive composition, and provide a uniform bonding strength. Herein, the "$D_{50}$ particle size" of the conductive filler represents a median diameter in a volume-basis particle size distribution curve obtained by measurement with a laser diffraction particle size analyzer.

The conductive filler particles have a tap density of from 1 to 10 g/cm$^3$, and preferably from 2 to 8 g/cm$^3$.

The shape of the conductive filler is not particularly limited, and examples of which include a spherical-shaped, approximately spherical-shaped, elliptical spherical-shaped, spindle-shaped, cube-shaped, approximately cube-shaped, flake-shaped, and unshaped-shaped. Among them, from the viewpoint of preservation stability, the spherical-shaped, approximately spherical-shaped, and flake-shaped fillers are preferably used.

Examples of the flake-shaped filler may include plate-shaped, lamellar-shaped, and scale-shaped fillers. Preferable examples of the flake-shaped filler include a particle having a thin plate shape in a side direction, and a circular shape, an elliptical shape, a polygonal shape, or an unshaped shape in a front face direction. The filler having such a shape has high contact area between the fillers, which may reduce voids in a cured product.

In one embodiment, the conductive filler is selected from flake-shaped silver filler, spherical-shaped silver filler, and mixture thereof. The silver fillers are commercially available from such as Metalor Technologies, Ferro Corp., Technic Inc., Eckart GmbH, Ames Goldsmith Corp., Potters Industries Inc., Dowa Holdings Co., Ltd., Mitsui and Fukuda. Examples of Flake-shaped silver filler are those sold by Metalor Technologies under the trade name of Silver flake EA. Examples of spherical-shaped or approximately spherical-shaped silver filler are those sold by Technic under the trade name of Silver powder FA SAB.

The conductive filler that can be used for the present invention can be manufactured by a known method such as a reduction method, a milling method, an electrolysis method, an atomization method, or a heat treatment method.

In one embodiment, the surface of the conductive filler may be coated with an organic substance.

The amount of the organic substance is preferably 0.01 to 10% by weight of the conductive filler, and more preferably 0.1 to 2% by weight. It is also preferable to adjust the amount of the organic substance according to the shape of the conductive filler or the like. The amount of the organic substance can be measured by volatilizing or thermally decomposing the organic substance by heating, and measuring a weight decrease, for example.

Herein, the state where a conductive filler is "coated with the organic substance" includes a state where an organic solvent is adhered to the surface of a conductive filler by dispersing the conductive filler in the organic solvent.

Examples of the organic substance coating the conductive filler may include a hydrophilic organic compound such as an alkyl alcohol having 1 to 5 carbon atoms, an alkanethiol having 1 to 5 carbon atoms, and an alkane polyol having 1 to 5 carbon atoms, or a lower fatty acid having 1 to 5 carbon atoms; and a hydrophobic organic compound such as a higher fatty acid having 15 or more carbon atoms and its derivatives, a middle fatty acid having 6 to 14 carbon atoms and its derivatives, an alkyl alcohol having 6 or more carbon atoms, an alkylamine having 16 or more carbon atoms, or an alkanethiol having 6 or more carbon atoms.

Among them, the higher fatty acid, the middle fatty acid, and their metal salts, amide, amine, or ester compounds are preferable. A water-repellent (hydrophobic) organic compound is more preferably a higher or middle fatty acid, or its water-repellent derivatives. In view of its coating effect, the higher or middle fatty acid is particularly preferable.

Examples of the higher fatty acid include a straight-chain saturated fatty acid such as pentadecanoic acid, hexadecane acid, heptadecanoic acid, octadecanoic acid, 12-hydroxy octadecanoic acid, eicosanoic acid, docosanoic acid, tetracosanoic acid, hexacosanoic acid (cerinic acid), or octacosanoic acid; a branched saturated fatty acid such as 2-pentyl nonanoic acid, 2-hexyl decanoic acid, 2-heptyl dodecanoic acid, or isostearic acid; and an unsaturated fatty acid such as palmitoleic acid, oleic acid, isooleic acid, elaidic acid, linoleic acid, linolenic acid, recinoleic acid, gadoleic acid, erucic acid, and selacholeic acid.

Examples of the middle fatty acid include a straight-chain saturated fatty acid such as hexanoic acid, heptanoic acid, octanoic acid, nonanoic acid, decanoic acid, undecanoic acid, dodecanoic acid, tridecanoic acid, or tetradecanoic acid; a branched saturated fatty acid such as isohexanoic acid, isoheptanoic acid, 2-ethylhexanoic acid, isooctane acid, isononanoic acid, 2-propyl heptanoic acid, isodecanoic acid, isoundecanoic acid, 2-butyl octanoic acid, isododecanoic acid, and isotridecanoic acid; and an unsaturated fatty acid such as 10-undecenoic acid.

Examples of a method for manufacturing a conductive filler having a surface coated with an organic substance include, but are not particularly limited to, a method for manufacturing a conductive filler in the presence of an organic solvent by a reductive method. Specifically, the conductive filler can be obtained by mixing a carboxylic acid silver salt with a primary amine, and depositing a conductive filler using a reducing agent in the presence of an organic solvent.

It is also preferable to disperse the obtained conductive filler in a solvent used for manufacturing the filler and add the dispersion directly to the curable adhesive composition of the present invention.

In addition, the surface of the conductive filler may be coated with organic substance layers of two or more. Such a filler can be obtained, for example, by dispersing the above manufactured conductive filler having a coating of an organic substance into other organic solvents. A solvent to be added to the curable adhesive composition of the present invention can be preferably used as such "other solvents".

When the surface of the conductive filler is coated with the organic substance, the aggregation of the conductive filler in the curable adhesive composition can be more prevented or reduced.

The conductive fillers may be used singly or in combination of two or more. Combination of fillers in different shapes or different sizes may reduce porosity of the cured product. Examples of the combination include, but not limited to, a mixture of a flake-shaped filler, and an approximately spherical-shaped filler having a central particle diameter smaller than that of the flake-shaped filler. The mass ratio of the flake-shaped filler and approximately spherical-shaped is the range from 0.3 to 5, and preferably from 0.4 to 3.

According to the present invention, the particles of the second metal or alloy are present in an amount of 60% to 95%, preferably 70% to 90%, and more preferably 75% to 85% by weight based on the total weight of the curable adhesive composition for die attach.

The curable adhesive compositions described herein can optionally include one or more curing agents. The curing agents can optionally function as initiator, promoters and/or reducing agents in the compositions. Curing agents contemplated for use in the practice of the present invention include ureas, aliphatic and aromatic amines, polyamides, imidazoles, dicyandiamides, hydrazides, urea-amine hybrid curing systems, free radical initiators, organic bases, transition metal catalysts, phenols, acid anhydrides, Lewis acids, Lewis bases, peroxides, and the like. See, for example, U.S. Pat. No. 5,397,618, the entire contents of which are hereby incorporated by reference herein. The incorporation of the curing agent depends on the selection of the thermosetting or thermoplastic resin component. If epoxy resins are used as resin components, examples of curing agent can be aliphatic and aromatic amines, acid anhydrides, imidazoles, and mixture thereof. If (meth)acrylates are used as resin components, the curing agent can be exemplified as peroxides, such as t-butyl hydroperoxide, t-butyl perbenzoate, benzoyl peroxide, cumene peroxide, cumene hydroperoxide, methyl ethyl ketone peroxide, and others known to the art.

The curing agent can optionally be present in the composition in an amount of 0% to 10%, preferably 0.1% to 8%, and more preferably 0.3% to 5% by weight based on the total weight of the curable adhesive composition for die attach.

The curable adhesive compositions described herein can further include a diluent, including, for example, an organic diluent. The organic diluent can be a reactive organic diluent, a non-reactive organic diluent, or a mixture thereof. Exemplary diluents include, for example, aromatic hydrocarbons (e.g., benzene, toluene, xylene, and the like); aliphatic hydrocarbons (e.g., hexane, cyclohexane, heptane, tetradecane, and the like); chlorinated hydrocarbons (e.g., methylene chloride, chloroform, carbon tetrachloride, dichloroethane, trichloroethylene, and the like); ethers (e.g., diethyl ether, tetrahydrofuran, dioxane, glycol ethers, monoalkyl or dialkyl ethers of ethylene glycol, and the like); esters (e.g., ethyl acetate, butyl acetate, methoxy propyl acetate, butoxyethoxyethyl acetate, and the like); polyols (e.g., polyethylene glycol, propylene glycol, polypropylene glycol, and the like); ketones (e.g., acetone, methyl ethyl ketone, and the like); amides (e.g., dimethylformamide, dimethylacetamide, and the like); heteroaromatic compounds (e.g., N-methylpyrrolidone, and the like); and heteroaliphatic compounds.

The amount of non-reactive diluent contemplated for use in accordance with the present invention can vary widely, so long as a sufficient quantity is employed to dissolve and/or disperse the components of invention compositions. When present, the amount of non-reactive diluent employed typically falls in the range of about 2 up to about 30 percent by weight of the composition.

As readily recognized by those of skill in the art, in certain embodiments, invention compositions contain substantially no non-reactive diluent therein. Even if non-reactive diluent is, at one time, present, it can be removed during the curing.

Invention formulations may further comprise one or more flow additives, adhesion promoters, rheology modifiers, toughening agents, fluxing agents, and/or radical polymerization regulators, as well as mixtures of any two or more thereof.

The curable adhesive composition according to the present invention can be prepared by mixing all components together to gain homogenous mixture. The mixing is done at room temperature. The mixing device can be for example orbital-motion (planetary) mixer, or compulsory mixer.

The curable adhesive composition of the present invention is in the form of liquid, and the Brookfield viscosity of the composition is preferably about 1,000 cPs to about 40,000 cPs at 25° C., at 5 rpm. The liquid adhesive composition in such range of viscosity has a good flowing property which makes it easy to be applied or injected onto a substrate. The bond line thickness of the curable adhesive composition can be controlled to less than 50 μm, preferably from 5 to 30 μm, and more preferably from 10 to 30 μm when applied. The curable adhesive composition is capable of being cured under 200° C. at nitrogen atmosphere.

Another aspect of the present invention relates to a cured product formed by thermally curing the curable adhesive composition, especially under 200° C. at nitrogen atmosphere. The cured product can exhibit a bond line thickness of less than 50 μm, preferably from 5 to 30 μm, and more preferably from 10 to 30 μm.

In this die attach process, the die is contacted to the die attach adhesive with a sufficient degree of pressure and/or heat so that the adhesive spreads and completely covers the substrate under the die. It is desirable that the adhesive further forms a fillet, that is, a raised rim or ridge, at the periphery of the die as show in FIG. 1. In the dispensing of die attach adhesives when thin dies are used and when dies are stacked, conventional paste die attach materials are not suitable for these applications because the die attach material does not readily form a fillet at the desired boundary and can easily overflow into, the crowded real estate of the semiconductor package and contaminate neighboring dies and electrical interconnects, or onto the top of the die, which will affect subsequent wire-bonding process. In addition, the right levels of adhesive flow and bonding are difficult to achieve without the application of pressure. When pressure is applied to thin dies, the dies can crack, or tilt, or warp.

Surprisingly, the curable adhesive compositions of the present invention and cured products are suitable for a thinner/smaller die having a size of less than 5 mm in width and less than 5 mm in length without the above drawbacks.

Another aspect of the present invention provides an assembly comprising a die adhered to a substrate by a cured product.

Yet another aspect of the present invention provides a process of die attach, comprising, (a) applying the curable adhesive composition to a substrate, (b) bringing the substrate and a die into intimate contact to form an assembly, and (c) subjecting the assembly to conditions suitable to cure the curable adhesive composition.

Specifically, the curable adhesive composition according to the present invention may be coated under pressure/loading force onto the surface of the substrate such as a printed circuit board following the predetermined route by means of the needle cylinder of an automatic dispensing system. Subsequently, the die is laminated onto the adhesive composition, and the height difference between the substrate and die is controlled by the spacer. After the adhesive is self-leveled on the whole bonding area, heating is conducted from top to bottom for curing at the atmosphere of air or nitrogen, and the curing time may generally be about 0.5 hour to about 5 hours. The loading force may generally be about 50 g to 1,000 g.

The cured product of the composition has a bond line thickness of less than 50 μm, preferably from 5 to 30 μm, and more preferably from 10 to 30 μm. The cured product also has a tilt of less than 30 μm, and preferably less than 20 μm, more preferably less than 15 μm.

The formulations described herein can be used within the electronics industry and other industrial applications. For example, the formulations described herein can be used for die attach applications on lead-frames for power discretes, for clip attach applications as wire bond replacements for high performance discretes, for heat slug attach applications for the cooling of power discretes with exposed pads, for single- and multi-die devices, and for other devices requiring high electrical and/or thermal conductivity between a die and a frame.

The following examples are intended to assist one skilled in the art to better understand and practice the present invention. The scope of the invention is not limited by the examples but is defined in the appended claims. All parts and percentages are based on weight unless otherwise stated.

EXAMPLES

Materials

EX-201-IM is resorcinol diglycidyl ether available from Nagase Chemtex Corporation.

DPM is dipropyleneglycol monomethyl ether available from Lyondell Chemical.

Epiclon B-570 is 4-methyl tetrahydrophthalic anhydride available from DIC.

Silver flake EA 0295-004 is a silver filler having tap density of 4.4 g/cm$^3$ and a $D_{50}$ particle size of 5.3 μm, available from Metalor Technologies.

Silver powder FA SAB 499 is a silver filler having a tap density of 5.6 g/cm$^3$ and a $D_{50}$ particle size of 3.9 μm, available from Technic Inc.

MCP 137 is a Bi58/Sn42 alloy having a tap density of 8.58 g/cm$^3$, and a $D_{50}$ particle size of 27 μm, available from 5N Plus Inc.

CM1016 is an X-bismaleimide available from Henkel, having the structure of

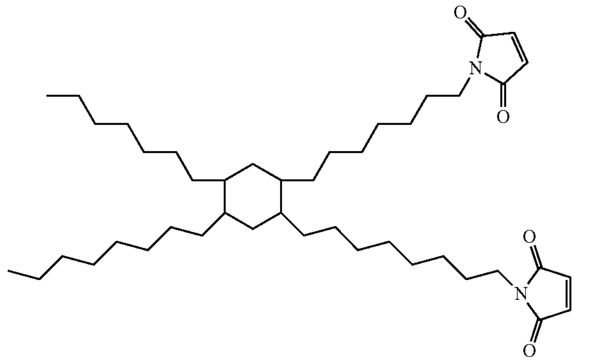 [SMILES: CCCCCCCCC1CC(CCCCCCCCN2C(=O)C=CC2=O)C(CCCCCCCN2C(=O)C=CC2=O)CC1CCCCCCC]

Ricon130MA20 is a polybutadiene oligomer adducted with maleic anhydride available from Sartomer Company. Inc.

SR423A is an isobornyl methacrylate available from Sartomer Company. Inc.

BEEA is a butoxyethoxyethyl acetate with a purity of 99% available from Sigma-Aldrich.

A6153 is a dicumyl peroxide available from Sigma-Aldrich.

SA0201 is a silver filler having a $D_{50}$ particle size of 5.3 μm, available from Metalor Technologies.

Epiclon N-730 is an epichlorohydrin-phenol formaldehyde available from Dainippon Ink & Chemical.

Seikacure-S is a 4,4'-diaminodiphenol sulfone available from Sumitomo Chemical. 1,4-butanedioldiglycidyl ether is available as 78-4603 from National Starch & Chemical.

Carbonic acid amine catalyst is N,N'-(4-methyl-1,3-phenylene)-bis-1-pyrrolidine-carboxamide from Chemica.

GS-230 is a divinylbenzene polymer spacer having a $D_{50}$ particle size of 30 μm, available from Seikisui Chemical.

Silpowder 81-637 is a silver spacer having a $D_{50}$ particle size of 30 μm, available from Technic Inc.

Example 1

5 g epoxy resin (EX-201-IM), 5 g solvent (DPM) and 5 g curing agent (Epiclon B-570) were added to a container and stirred for 2 min at 2000 rpm by using a thinky mixer (Thinky Corporation, ARV-310) to obtain a homogeneous solution. Then 24.5 g flake-shaped silver filler (Silver flake EA 0295-004) and 59.2 g spherical-shaped silver filler (Silver powder FA SAB 499) were added in and stirred for 2 min at 1500 rpm. Finally, 1.3 g spacers (MCP 137) was added in and stirred for 2 min at 1500 rpm at vacuum condition to obtain a homogeneous curable adhesive paste. The prepared paste density is about 5.5 g/cm$^3$. The paste composition was loaded on a die with the following conditions: The loading of the spacer is 1.3 wt % (20/mm$^2$). The curing process is 5° C./min to 140° C. maintaining 30 min and then, 5° C./min to 200° C. maintaining 60 min at $N_2$ atmosphere. The die size is 1 mm×1 mm. The loading force is 100 g.

Example 2

5 g BMI resin (CM1016), 1.5 g BMI oligomer (Ricon130MA20), 4 g (meth)acrylate monomer (SR423A), 5 g diluent (BEEA) and 0.5 g curing agent (A6153) were added to a container and stirred for 2 min at 2000 rpm by using a thinky mixer (Thinky Corporation, ARV-310) to obtain a homogeneous solution, Then, 82.5 g spherical-shaped silver filler (SA 0201) was added in and stirred for 2 min at 1500 rpm. Finally, 1.5 g spacers (MCP 137) was added in and stirred for 2 min at 1500 rpm at vacuum condition to obtain a homogeneous curable adhesive paste. The prepared paste density is about 4.9 g/cm$^3$. The paste composition was loaded on a die with the following conditions. The loading of the spacer is 1.5 wt % (20/mm$^2$). The curing process is 5° C./min to 200° C. maintaining 30 min at $N_2$ atmosphere. The die size is 1 mm×1 mm. The loading force is 100 g.

Example 3

15 g epoxy resin (Epiclon N-730), 2 g curing agent (Sekiacure-S), 7 g diluent (1,4-butanediol diglycidyl ether) and 1 g catalyst (carbonic acid amine) were added to a container and stirred for 2 min at 2000 rpm by using a thinky mixer (Thinky Corporation, ARV-310) to obtain a homogeneous solution, Then, 73.1 g flake-shaped silver filler (Silver flake EA 0295-004) was added in and stirred for 2 min at 1500 rpm. Finally, 1.9 g spacers (MCP 137) was added in and stirred for 2 min at 1500 rpm at vacuum condition to obtain a homogeneous curable adhesive paste. The prepared paste density is about 4.0 g/cm$^3$. The paste composition was loaded on a die with the following conditions. The loading of the spacer is 1.9 wt % (20/mm$^2$). The curing process is 5° C./min to 175° C. maintaining 60 min at $N_2$ atmosphere. The die size is 1 mm×1 mm. The loading force is 100 g.

Comparative Example 1

5 g epoxy resin (EX-201-IM), 5 g solvent (DPM) and 5 g curing agent (Epiclon B-570) were added to a container and stirred for 2 min at 2000 rpm by using a thinky mixer (Thinky Corporation, ARV-310) to obtain a homogeneous solution. 25 g flake-shaped silver filler (Silver flake EA 0295-004) and 59.8 g spherical-shaped silver filler (Silver powder FA SAB 499) were added in and stirred for 2 min at 1500 rpm then. Finally, 0.2 g spacers (GS-230) was added in and stirred for 2 min at 1500 rpm at vacuum condition to obtain a homogeneous curable adhesive paste. The prepared paste density is about 5.5 g/cm$^3$. The paste composition was loaded on a die with the following conditions. The loading of the spacer is 0.2 wt % (20/mm$^2$). The curing process is 5° C./min to 140° C. maintaining 30 min and 5° C./min to 200° C. maintaining 60 min at $N_2$ atmosphere. The die size is 1 mm×1 mm. The loading force is 100 g.

Comparative Example 2

5 g BMI resin (CM1016), 1.5 g BMI oligomer (Ricon130MA20), 4 g (meth)acrylate monomer (SR423A), 5 g diluent (BEEA) and 0.5 g curing agent (A6153) were added to a container and stirred for 2 min at 2000 rpm by using a thinky mixer (Thinky Corporation, ARV-310) to obtain a homogeneous solution, Then, 81.8 g spherical-shaped silver filler (SA 0201) was added in and stirred for 2 min at 1500 rpm. Finally, 2.2 g spacers (Silpowder 81-637) was added in and stirred for 2 min at 1500 rpm at vacuum condition to obtain a homogeneous curable adhesive paste. The prepared paste density is about 4.9 g/cm$^3$. The paste composition was loaded on a die with the following conditions. The loading of the spacer is 2.2 wt % (20/mm$^2$). The curing process is 5° C./min to 200° C. maintaining 30 min at $N_2$ atmosphere. The die size is 1 mm×1 mm. The loading force is 100 g.

Performance Evaluation

The following methods were used to evaluate the examples before curing and after curing.

BLT

The BLT was measured by Leica DMS1000 microscope (manufactured by Leica Microsystems). The heights of the four corners of the die with and without the paste, before and after curing, were measured and averaged respectively. The substrate was set as the zero-height base line. The BLTs before curing and after curing were calculated as follows:

The BLT before curing=(the average height of the die with the paste before curing)−(the average height of the die without the paste before curing)

The BLT after curing=(the average height of the die with the paste after curing)−(the average height of the die without the paste after curing)

Tilt Trend

The tilt trend was measured by Leica DMS1000 microscope (manufactured by Leica Microsystems). The tilts before curing and after curing were calculated as follows:

The tilt before curing=(the highest height of the die with the paste before curing)−(the lowest height of the die with the paste before curing)

The tilt after curing=(the highest height of the die with the paste after curing)−(the lowest height of the die with the paste after curing)

Void

The voids of the cured adhesive were measured by observing the die with cured adhesive by using a Phoenix X-Ray machine (manufactured by Phoenix X-Ray Systems & Services GmbH). Void can be visually found directly from the obtained X-Ray images. If no voids were found on the image, it was evaluated as "No", and if any void was clearly found on the image, it was evaluated as "Yes".

Figure 3:
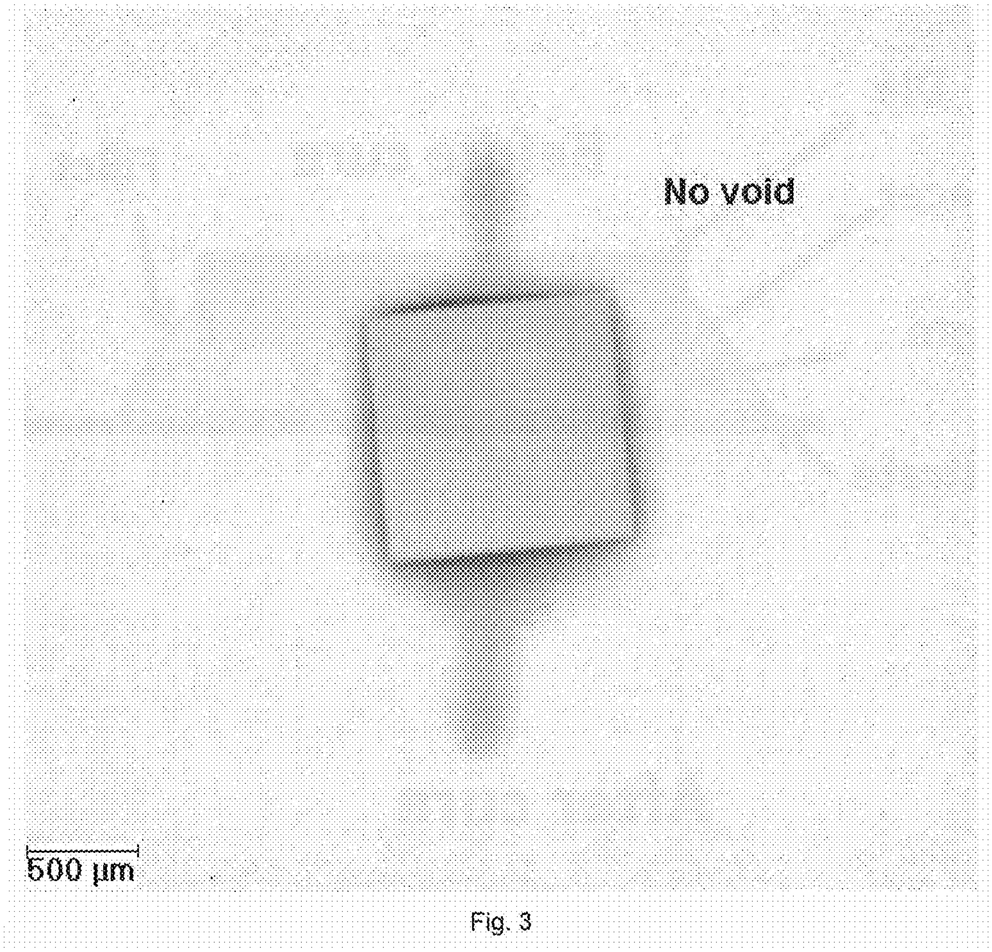
FIG. 3 is an X-ray microscopic image showing the surface of the cured adhesive paste according to Example 1.
Figure 4:
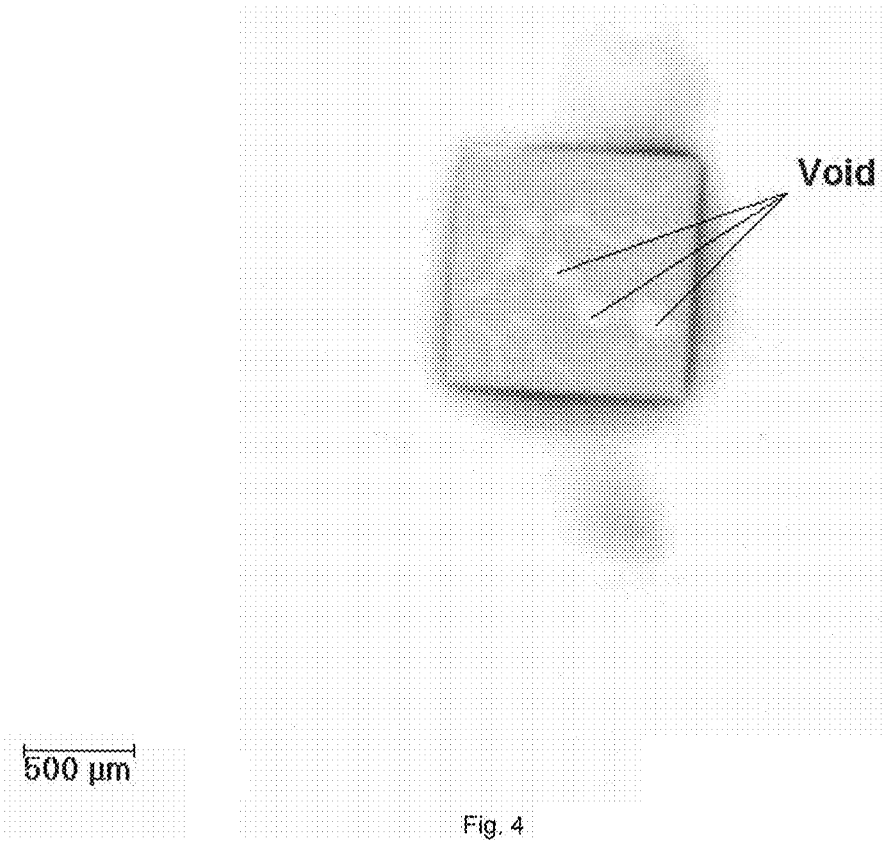
FIG. 4 is an X-ray microscopic image showing the surface of the cured adhesive paste according to Comparative Example 1.
Figure 5:
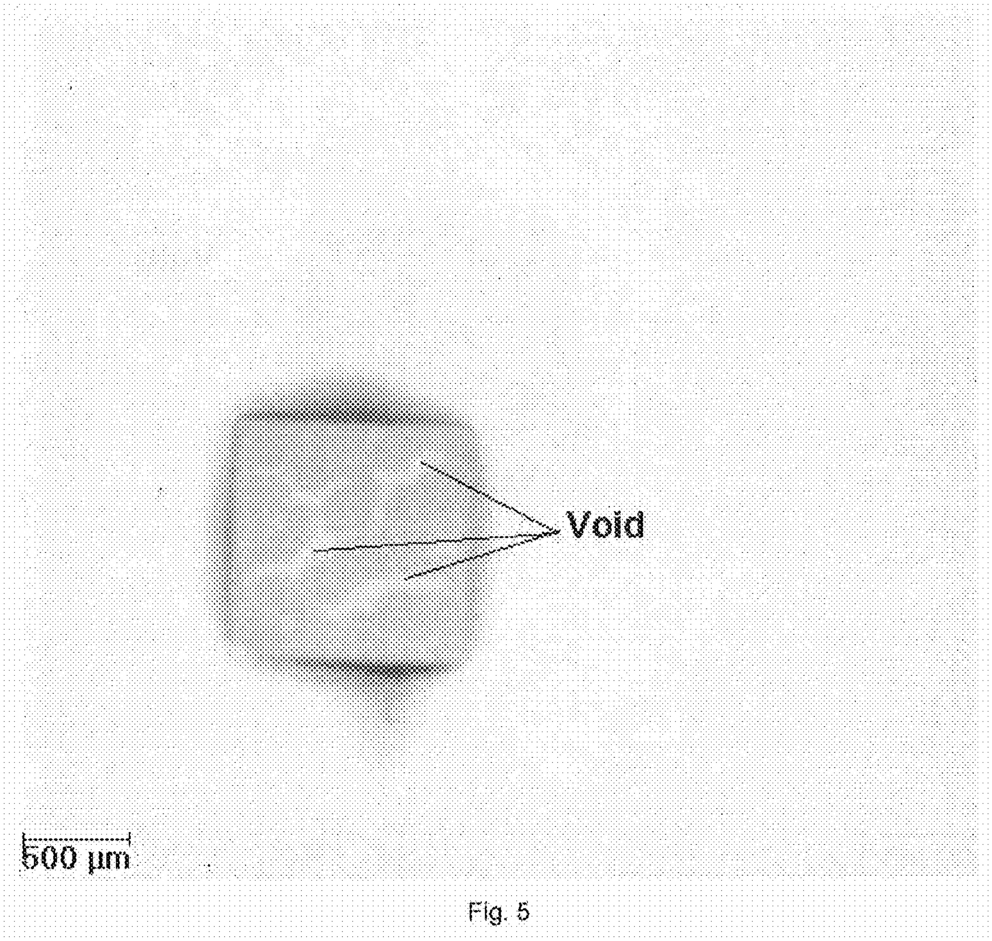
FIG. 5 is an X-ray microscopic image showing the surface of the cured adhesive paste according to Comparative Example 2.

The test results are shown in Table 1. It is clear that all inventive examples have excellent control of BLT, fillet, tilt trend and void (as shown in FIG. 3) in the application of smaller size die, while all comparative examples containing conventional spacers of organic polymer or high melting point metal exhibited interior properties in tilt trend and void (as shown in FIGS. 4 and 5).

TABLE 1

Test results

| Test Item | Ex. 1 | Ex. 2 | Ex. 3 | CEx. 1 | CEx. 2 |
|---|---|---|---|---|---|
| BLT, before curing (μm) | 22.2 | 24 | 17.4 | 29.8 | 25.3 |
| BLT, after curing (μm) | 18.2 | 18.6 | 15 | 24.4 | 24.8 |
| Tilt, before curing (μm) | 9.8 | 14.5 | 13 | 20.8 | 9.3 |
| Tilt, after curing (μm) | 9.8 | 11 | 9.8 | 16.8 | 12.7 |
| Void | No | No | No | Yes | Yes |

What is claimed is:

1. A curable adhesive composition, comprising (1) a thermosetting or thermoplastic resin component, (2) a plurality of particles of a first metal or alloy having a melting point from 50° C. to 300° C., a $D_{50}$ particle size of from 10 μm to 100 μm, and a tap density of 3-12 g/cm$^3$, wherein the particles of the first metal or alloy comprise at least one of indium (In), germanium (Ga), bismuth (Bi), or tin (Sn), (3) a plurality of particles of a second metal or alloy having a melting point higher than 300° C., and a $D_{50}$ particle size of from 0.1 μm to less than 10 μm, wherein the particles of the second metal or alloy comprise at least one of gold (Au), silver (Ag), nickel (Ni), aluminum (Al) or copper (Cu), and wherein the particles of the second metal or alloy are coated with at least two layers of an organic substance, and (4) a curing agent.

2. The curable adhesive composition according to claim 1, wherein the thermosetting or thermoplastic resin component is selected from epoxy monomer, epoxy oligomer, epoxy polymer, (meth) acrylic monomer, (meth) acrylic oligomer, (meth) acrylic polymer, phenol- formaldehyde resin, polyurethane, cyanate ester, polyvinyl alcohol, a polyester, polyurea, polyvinyl acetal resin, phenoxy resin, maleimide, bismaleimide, nadimide, itaconamide, polyimide, and mixture thereof.

3. The curable adhesive composition according to claim 1, wherein the particles of the first metal or alloy comprise essentially no lead (Pb) and cadmium (Cd).

4. The curable adhesive composition according to claim 1, wherein the $D_{50}$ particle size of the particles of the first metal or alloy is from 10 μm to 50 μm.

5. The curable adhesive composition according to claim 1, wherein the $D_{50}$ particle size of the particles of the second metal or alloy is from 0.5 μm to 8 μm.

6. The curable adhesive composition according to claim 1, which is capable of being cured under 200° C. at nitrogen atmosphere.

7. The curable adhesive composition according to claim 1, which has a bond line thickness of less than 50 μm.

8. A cured product, which is formed by thermally curing the curable adhesive composition according to claim 1.

9. The cured product according to claim 8, which has a bond line thickness of less than 50 μm.

10. An assembly comprising a die adhered to a substrate by a cured product according to claim 9.

11. The assembly according to claim 10, wherein the die has a width of no more than 5 mm, and a length of no more than 5 mm.

12. A process of die attach, comprising, (a) applying a curable composition of claim 1 to a substrate, (b) bringing the substrate and a die into intimate contact to form an assembly, and (c) subjecting the assembly to conditions under 200° C. at nitrogen atmosphere to cure the curable adhesive composition.

13. The curable adhesive composition according to claim 1, wherein the organic substance comprises a hydrophilic organic compound or a hydrophobic organic compound.

14. The curable adhesive composition according to claim 13, wherein the organic substance comprises a hydrophobic organic compound.

15. The curable adhesive composition according to claim 1, wherein the organic substance comprises a fatty acid having 15 or more carbon atoms, a fatty acid having 6-14 carbon atoms, or a metal salt, amide, amine, or ester thereof.

16. The curable adhesive composition according to claim 1, wherein the organic substance is present in an amount of 0.1-2% by weight of the particles of the second metal or alloy.

* * * * *